(12) United States Patent
Wen et al.

(10) Patent No.: US 11,955,902 B2
(45) Date of Patent: Apr. 9, 2024

(54) POWER REGULATING UNIT AND TRANSPORT REFRIGERATION DEVICE USING THE POWER REGULATING UNIT

(71) Applicant: CARRIER CORPORATION, Palm Beach Gardens, FL (US)

(72) Inventors: Yiming Wen, Shanghai (CN); Jack Linhui Chen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 309 days.

(21) Appl. No.: 17/132,899

(22) Filed: Dec. 23, 2020

(65) Prior Publication Data

US 2022/0038023 A1     Feb. 3, 2022

(30) Foreign Application Priority Data

Jul. 31, 2020    (CN) .......................... 202010760327.4

(51) Int. Cl.
    *H02J 9/06*          (2006.01)
    *F25D 11/00*         (2006.01)
                  (Continued)

(52) U.S. Cl.
    CPC ........... *H02M 7/217* (2013.01); *F25D 11/003* (2013.01); *H02J 7/06* (2013.01); *H02M 7/1557* (2013.01); *H02J 2207/20* (2020.01)

(58) Field of Classification Search
    CPC .. H02M 7/217; H02M 7/1557; H02M 1/0022; H02M 1/007; H02M 1/008;
                 (Continued)

(56) References Cited

U.S. PATENT DOCUMENTS

| 2011/0057724 A1* | 3/2011 | Pabon | ................... | H02M 7/219 307/31 |
| 2013/0091872 A1* | 4/2013 | Hurych | ................. | H02M 7/162 62/323.3 |

(Continued)

FOREIGN PATENT DOCUMENTS

| EP | 2766983 A1 | 8/2014 |
| WO | 2011026047 A1 | 3/2011 |

OTHER PUBLICATIONS

European Search Report for Application No. 20214271.7; dated May 31, 2021; 10 Pages.

*Primary Examiner* — Daniel Cavallari
*Assistant Examiner* — Xuan Ly
(74) *Attorney, Agent, or Firm* — CANTOR COLBURN LLP

(57) ABSTRACT

The present disclosure relates to a power regulating unit and a transport refrigeration device using the same, and belongs to the technical field of power supplies. The power regulating unit of the present disclosure comprises: a rectifier module configured to perform a rectification operation on an AC input to obtain a first DC signal; a controller configured to control the rectification operation of the rectifier module based on corresponding parameter information for reflecting fluctuations of the AC input to prevent the first DC signal obtained from being affected by the fluctuations; a first output port configured to output the first DC signal; a first DC-DC conversion module configured to convert the first DC signal into a second DC signal; and a second output port configured to output the second DC signal. The power regulating unit of the present disclosure can provide multi-mode DC outputs and the DC outputs are stable.

9 Claims, 2 Drawing Sheets

(51) Int. Cl.
　　　*H02J 7/06*　　　(2006.01)
　　　*H02M 1/00*　　　(2006.01)
　　　*H02M 1/12*　　　(2006.01)
　　　*H02M 3/00*　　　(2006.01)
　　　*H02M 7/155*　　(2006.01)
　　　*H02M 7/217*　　(2006.01)
　　　*H02M 7/219*　　(2006.01)

(58) Field of Classification Search
　　　CPC .......... H02M 1/12; H02M 7/219; H02M 3/01;
　　　　　　　H02M 7/04; H02M 3/00; H02M 7/12;
　　　　　　F25D 11/003; H02J 7/06; H02J 2207/20;
　　　　　　　　　　　　　　　　　　　H02J 7/0068
　　　USPC ........................................................ 307/9.1
　　　See application file for complete search history.

(56) References Cited

U.S. PATENT DOCUMENTS

| | | | |
|---|---|---|---|
| 2017/0093287 A1* | 3/2017 | Dai | H02M 3/33573 |
| 2017/0117731 A1 | 4/2017 | Shimada et al. | |
| 2019/0329663 A1* | 10/2019 | Kominami | H02J 7/0013 |
| 2021/0028691 A1* | 1/2021 | Martinez Perez | H02M 3/00 |
| 2021/0070137 A1* | 3/2021 | Andrade Dias | B60H 1/00428 |

\* cited by examiner

POWER REGULATING UNIT AND TRANSPORT REFRIGERATION DEVICE USING THE POWER REGULATING UNIT

CROSS-REFERENCE TO RELATED APPLICATIONS

This application claims the benefit of Chinese Application No. 202010760327.4 filed Jul. 31, 2020, the disclosure of which is incorporated herein by reference in its entirety.

BACKGROUND

The present disclosure belongs to the technical field of power supplies, and relates to a power regulating unit that converts an alternating current (AC) input into a direct current (DC) output, and a transport refrigeration device using the power regulating unit A power regulating unit can convert an alternating current (AC) input into a direct current (DC) output and provide a corresponding DC signal. It can be arranged in, for example, a transport refrigeration device (such as a refrigerated truck) to provide DC power supply for its refrigeration units.

At present, a type of power regulating units simply use a diode-bridge rectifier to convert an AC input into a DC output, and only provide a DC output mode to supply DC power to the refrigeration units. Another type of power regulating units (such as on board chargers) use bridge-less rectification technology (such as a bridge-less rectifier module composed of MOSs and diodes) to convert AC into DC and boost DC to a design value, and then controls the output power through an LLC resonant circuit.

BRIEF DESCRIPTION

According to one aspect of the present disclosure, a power regulating unit for converting an AC input into a DC output is provided, which comprises: a rectifier module configured to perform a rectification operation on the AC input to obtain a first DC signal; a controller configured to control the rectification operation of the rectifier module based on corresponding parameter information for reflecting fluctuations of the AC input to prevent the first DC signal obtained substantially from being affected by the fluctuations; a first output port configured to output the first DC signal; a first DC-DC conversion module configured to convert the first DC signal into a second DC signal; and a second output port configured to output the second DC signal.

According to an additional or alternative embodiment, the power regulating unit further comprises: a second DC-DC conversion module configured to convert the first DC signal into a third DC signal; and a third output port configured to output the third DC signal.

According to an additional or alternative embodiment, the first DC-DC conversion module is configured as a DC charging output device capable of providing a constant voltage or constant current charging mode.

According to an additional or alternative embodiment, the first DC-DC conversion module and/or the second DC-DC conversion module comprises an LLC resonance circuit.

According to an additional or alternative embodiment, the first DC signal is a high-voltage DC power supply suitable for supplying power to a refrigeration unit, the second DC signal is a DC charging power supply suitable for charging a high-voltage battery pack, and the third DC signal is a low-voltage DC power supply suitable for supplying power to the controller of the refrigeration unit, wherein the output voltage of the low-voltage DC power supply is smaller than the output voltage of the high-voltage DC power supply.

According to an additional or alternative embodiment, the parameter information comprises AC voltage and AC frequency; or the parameter information comprises AC voltage, generator speed and/or generator temperature, wherein the AC input is output and provided by the generator.

According to an additional or alternative embodiment, the controller is configured to comprise: a parameter information processing unit for analyzing and processing the received parameter information; a comparison unit for comparing the corresponding parameter information that is analyzed and processed with a predetermined value to determine the magnitude of fluctuations; and a rectification control signal generating unit for generating a rectification control signal for the switch element of the rectifier module based on the magnitude of fluctuations.

According to an additional or alternative embodiment, the controller is configured to further comprise: a DC conversion control unit configured to generate a DC conversion control signal for controlling the DC-DC conversion operation.

According to an additional or alternative embodiment, the rectifier module is a thyristor module or an Insulated Gate Bipolar Transistor (IGBT) rectifier module.

According to another aspect of the present disclosure, a transport refrigeration device is provided, which comprises a refrigerator unit and a refrigeration unit controller, and further comprises anyone of power regulating units as described above, wherein the first output port of the power regulating unit outputs a first DC signal to the refrigeration unit to supply power thereto, and the second output port of the power regulating unit outputs a second DC signal for charging the high-voltage battery pack.

According to an additional or alternative embodiment, the high-voltage battery pack is a dedicated battery pack provided in the transport refrigeration device.

According to an additional or alternative embodiment, the third output port of the power regulating unit outputs a third DC signal to the refrigeration unit controller to supply power thereto.

The above features, operations and advantages of the present invention will become more apparent based on the following description and the accompanying drawings.

BRIEF DESCRIPTION OF THE DRAWINGS

From the following detailed description in conjunction with the accompanying drawings, the above and other objectives and advantages of the present disclosure will be more complete and clear, wherein the same or similar elements are denoted by the same reference numerals.

DETAILED DESCRIPTION

For brevity and illustrative purposes, the principles of the present invention will be described with reference mainly to the exemplary embodiments thereof. However, those skilled in the art would readily recognize that the same principles can be equally applied to all types of power regulating units and/or transport refrigeration devices using power regulating units, and these same principles can be implemented therein, while any such changes do not depart from the true spirit and scope of the present patent application. In addition, in the following description, reference is made to the accompanying drawings, which illustrate specific exemplary embodiments. Electrical, mechanical, logical, and structural modifications can be made to these embodiments without departing from the spirit and scope of the present invention. Moreover, although the features of the present invention are disclosed in conjunction with only one of several implementations/embodiments, if, however, the features may be desired and/or advantageous for any given or identifiable function, they can be combined with one or more other features of other implementations/embodiments. Therefore, the following description should not be considered as restrictive, and the scope of the present invention is defined by the appended claims and their equivalents.

Although numerical ranges and parameters that describe the present invention in a broad sense are applicable, the numerical values set forth in the specific examples are reported as precisely as possible. However, any numerical value inherently includes certain errors inevitably caused by the standard deviations commonly seen in the corresponding test measurements thereof. In addition, all ranges disclosed herein should be understood to encompass any and all sub-ranges comprised therein. When used, the terms "first", "second", etc. do not necessarily indicate any order or priority relationship, but may be used to more clearly distinguish elements and the like from each other.

The power regulating unit of the following examples is described in the application environment of a transport refrigeration device (such as a transport refrigeration unit TRU). It is understood that the power regulating unit of the following examples can also be applied to other devices having similar power supply requirements as the transport refrigeration device.

Figure 1:
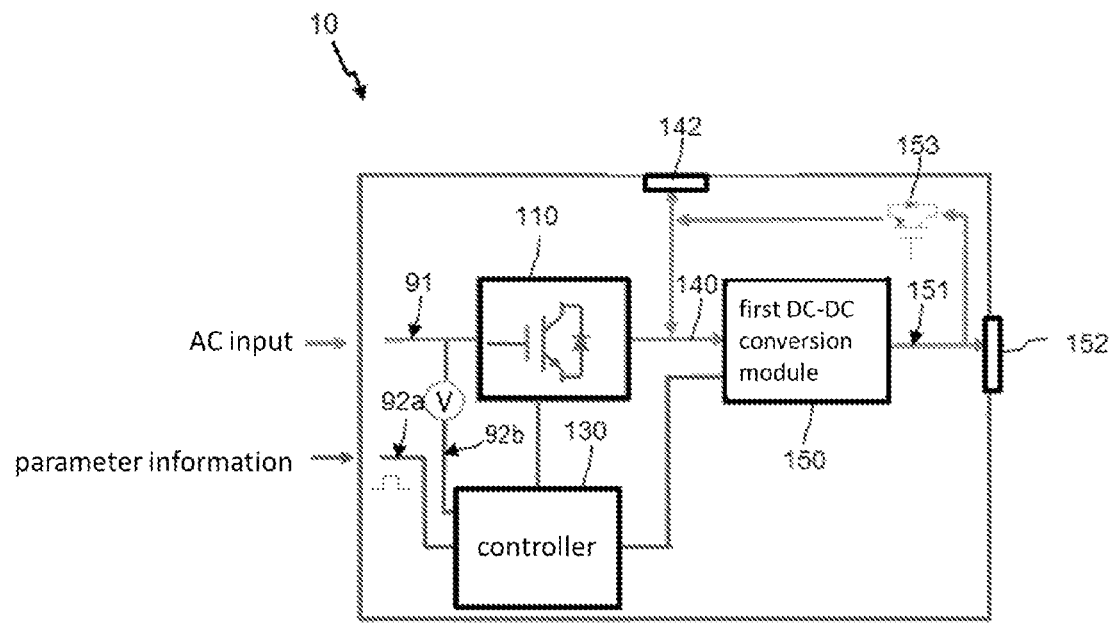
FIG. 1 is a schematic diagram of a module structure of a power regulating unit according to an embodiment of the present disclosure.

FIG. 1 shows a schematic diagram of a module structure of a power regulating unit according to an embodiment of the present disclosure. Referring to FIG. 1, a power regulating unit 10 can convert an AC input 91 into a DC output. For example, the power regulating unit 10 provides two DC outputs through a first output port 142 and a second output port 152, thereby providing dual-mode DC outputs.

The AC input 91 may be various types of AC signals, which, for example, may be provided by a generator, or by mains supply. It is understood that the source or type of the AC input 91 is not restrictive. It can be selected and determined according to the specific application environment of the power regulating unit.

The power regulating unit 10 mainly comprises a rectifier module 110 that can be configured to perform a rectification operation on the AC input 91 to obtain a first DC signal, wherein the first DC signal is a high-voltage DC power supply suitable for supplying power to a refrigeration unit, which has a relatively high voltage (for example, its voltage is greater than or equal to 250V and smaller than or equal to 750V). For example, the voltage of the first DC signal can reach 650V. The input port of the rectifier module 110 is connected to the AC input 91, and the output port is electrically connected to a high-voltage DC bus 140. The first DC signal can be directly output to the high-voltage DC bus 140 inside the power regulating unit 10. The first DC signal on the high-voltage DC bus 140 can be output through a first output port 142, so as to supply power to the high-voltage loads of the refrigeration unit.

The inventor noticed that the AC input 91 is prone to fluctuations due to various factors (for example, the generator power is prone to large fluctuations when the generator on the vehicle provides an AC power), so the DC output of the existing power regulating unit is unstable. This is very disadvantageous for high-voltage loads such as refrigeration units.

In one embodiment, in view of the fluctuations of the AC input 91, the power regulating unit 10 is further provided with a controller 130, and corresponding parameter information 92 for reflecting the fluctuations of the AC input 91 is input into the controller 130. The controller 130 is configured to control the rectification operation of the rectifier module 110 based on the corresponding parameter information 92 to prevent the first DC signal obtained substantially from being affected by the fluctuations of the AC input 91. For example, the first DC signal output to the high-voltage DC bus 140 has a stable DC voltage and basically has no voltage fluctuations. In this way, even if the AC input 91 undergoes significant fluctuations in AC voltage and/or AC frequency etc., the high-voltage DC power output from the first output port 142 remains stable, thus having little impact on high-voltage loads such as refrigeration units.

In one embodiment, the parameter information 92 reflecting the fluctuations of the AC input 91 mainly comprises AC voltage 92b and AC frequency 92a. When the AC input 91 is provided by, for example, mains supply, the AC voltage 92b and AC frequency 92a can be obtained through corresponding acquisition elements. In another embodiment, if the AC input is output and provided by a generator, the parameter information 92 reflecting the fluctuations of the AC input 91 may mainly comprise AC voltage 92b, generator speed, and may further comprise generator temperature. Among them, the generator speed is used to reflect the AC frequency, which can be accurately acquired by an acquisition component 302 provided in the corresponding generator 301. It is understood that any parameter information that can be used to characterize the changes of the AC voltage 92b/AC frequency 92a can be acquired and connected to the controller 130.

The rectifier module 110 may specifically be a thyristor module, which may be realized by, for example, multiple thyristors. The rectifier module 110 may also specifically be an IGBT (Insulated Gate Bipolar Transistor) rectifier module, which may be realized by multiple IGBTs. The rectification control signal output by the controller 130 can be loaded on the thyristors or IGBTs to actively control the turn-on or turn-off thereof, so that the output of the rectifier module 110 remains stable.

With continued reference to FIG. 1, a first direct current-direct current (DC/DC) conversion module 150 is further provided in the power regulating unit 10. The first DC-DC conversion module 150 is configured to receive the first DC signal and convert the first DC signal into a second DC signal 151 that is different from the first DC signal. A second output port 152 of the power regulating unit 10 is provided corresponding to the first DC signal, and the second DC signal is output from the second output port 152. Therefore, the power regulating unit 10 can provide two different DC outputs.

In one embodiment, the first DC signal is a high-voltage DC power supply suitable for supplying power to high-voltage loads such as refrigeration units, and the second DC signal 151 is a DC charging power supply suitable for charging high-voltage battery packs. As such, the power regulating unit 10 can provide two completely different output modes. In the first output mode, the power regulating unit 10 outputs a high-voltage DC power supply accordingly, which can supply power to high-voltage loads similar to refrigeration units; in the second output mode, the power regulating unit 10 outputs a DC charging power supply accordingly, which can charge high-voltage battery packs. Thus, in an application environment where, for example, a transport refrigeration device has only the AC input 91, the power regulating unit 10 can conveniently supply the refrigeration units with stable power supply, and can also charge the dedicated battery packs of the transport refrigeration device, thereby easily meeting the power supply requirements of the transport refrigeration device, and enabling the refrigeration units to work reliably with longevity.

Correspondingly, the first DC-DC conversion module 150 may be configured as a DC charging output device capable of providing a constant voltage or constant current charging mode. The output power of the first DC-DC conversion module 150 is controllable, and it operates in different modes (for example, in constant voltage mode, constant current mode) to charge high-voltage battery packs.

In an example, when the first DC-DC conversion module 150 is triggered to perform the charging operation, the first DC-DC conversion module 150 may first operate in a constant current mode to provide a DC charging power supply with constant current output, and then convert into operate in a constant voltage mode to provide a DC charging power supply with constant voltage output. The first DC-DC conversion module 150 can be connected to the controller 130, and the controller 130 controls the first DC-DC conversion module 150 to perform the constant voltage mode-constant current mode conversion operation, thereby completing the specific charging control process. It is understood that the specific charging operation of the DC charging output device is not restricted to the above examples, and can be designed according to the corresponding requirements of the high-voltage battery packs.

Specifically, the first DC-DC conversion module may be realized by an LLC resonance circuit, and the specific circuit structure of the LLC resonance circuit is not restrictive.

With continued reference to FIG. 1, a connecting circuit is provided between the second output port 152 and the first output port 142. Through the connecting circuit, the high-voltage battery packs corresponding to the second output port 152 can supply power to high-voltage loads such as refrigeration units (for example, in the absence of AC input 91). The connecting circuit is further provided with a power switch element 153 (such as an IGBT) controlled by the controller 130. When the controller 130 controls the rectifier module 110 and the first DC-DC conversion module 150 to work at the same time, in order to prevent the high-voltage battery packs being charged from supplying power to, for example, the refrigeration units, the controller 130 can simultaneously control the power switch element 153 to turn off.

It should be noted that the components of the power regulating unit 10 described in the above examples can be integrated on a circuit board, so as to make the overall structure thereof compact and space-saving.

Figure 2:
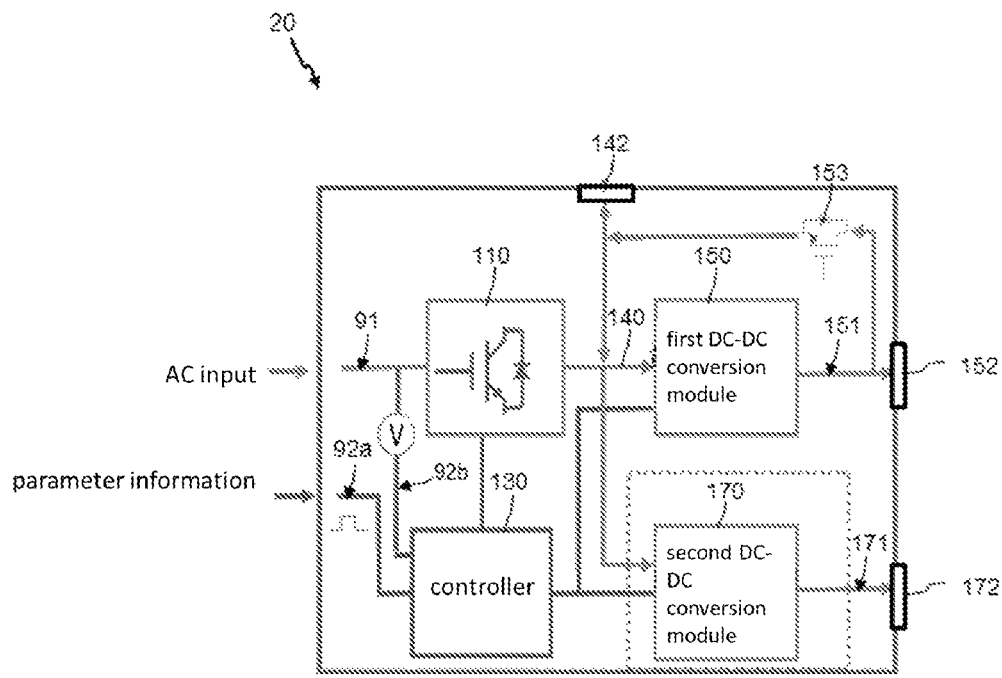
FIG. 2 is a schematic diagram of a module structure of a power regulating unit according to another embodiment of the present disclosure.

FIG. 2 is a schematic diagram of a module structure of a power regulating unit according to another embodiment of the present disclosure. Referring to FIG. 2, power regulating unit 20 provides one more DC output mode compared with power regulating unit 10. Accordingly, the power regulating unit 20 is further provided with a second DC-DC conversion module 170. The second DC-DC conversion module 170 is configured to receive the first DC signal and convert the first DC signal into a third DC signal 171. The power regulating unit 20 further comprises a third output port 172 for outputting the third DC signal 171.

The third DC signal 171 may be a low-voltage DC power supply suitable for supplying power to the controller of the refrigeration units, wherein the output voltage of the low-voltage DC power supply is significantly lower than the output voltage of the high-voltage DC power supply at the first output port 142, for example, the output voltage thereof is lower than 36V (for example, 12V or 24V). The third output port 172 can therefore provide DC power supply to the low-voltage loads of the transport refrigeration device, thereby better meeting the power supply requirements in the use environments similar to that of the transport refrigeration device.

With continued reference to FIG. 2, the second DC-DC conversion module 170 may be connected to the controller 130, and the controller 130 controls the second DC-DC conversion module 170 to perform the corresponding DC conversion operation, thereby completing the conversion process from DC high voltage to DC low voltage. The second DC-DC conversion module 170 can also be realized by an LLC resonance circuit, and the specific circuit structure of the LLC resonance circuit is not restrictive.

It is understood that the power regulating unit 20 may also be integrated with elements or components of the power regulating unit 10 and can obtain the same or similar functions, which will not be described in detail here.

Figure 3:
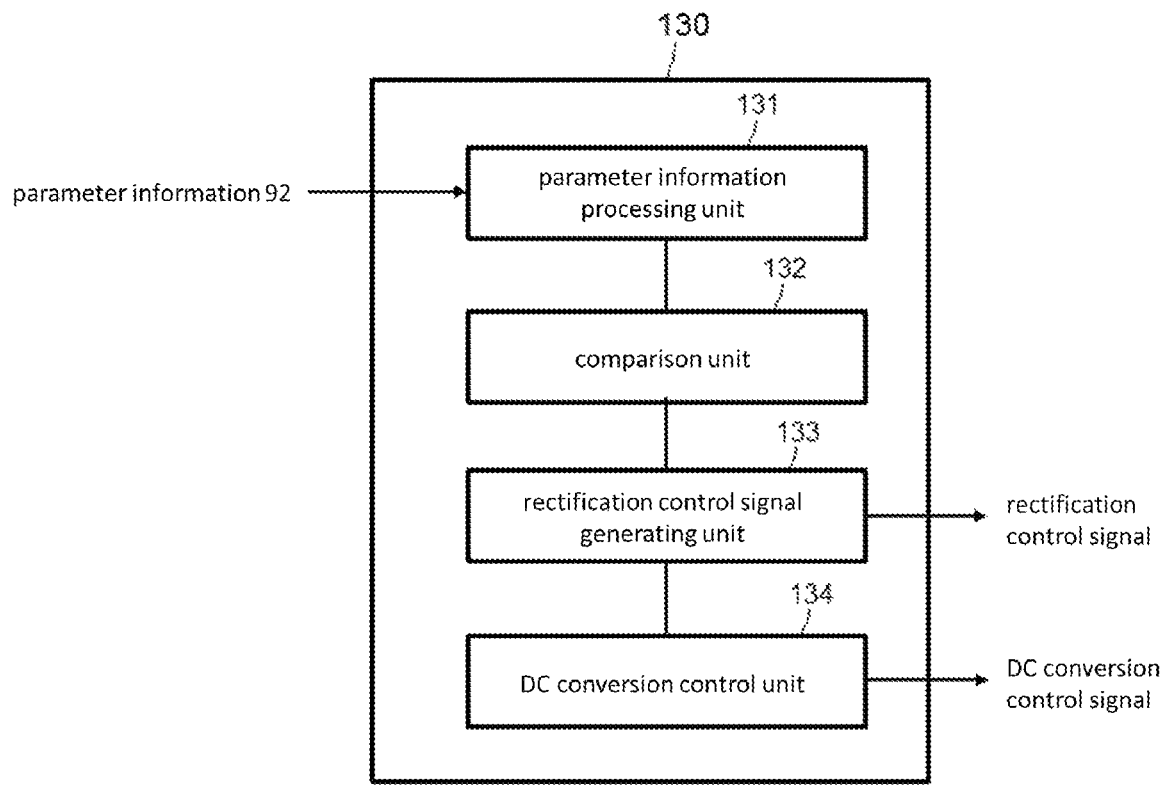
FIG. 3 is a schematic diagram of a module structure of a controller used by a power regulating unit according to an embodiment of the present disclosure.

FIG. 3 shows the module structure of the controller 130 used in the power regulating unit 10 or 20, wherein the controller 130 may comprise a parameter information processing unit 131, a comparison unit 132, a rectification control signal generating unit 133, and a DC conversion control unit 134. The parameter information processing unit 131 can analyze and process the parameter information 92a or 92b received, such as extracting the characteristic value of the corresponding AC voltage or AC frequency in the parameter information 92a or 92b. The comparison unit 132 can compare the corresponding parameter information that is analyzed and processed with a predetermined value to determine the magnitude of fluctuations. It is understood that the predetermined value can be determined by the AC input 91 in a stable state. The rectification control signal generating unit 133 can generate a rectification control signal for the switch elements (such as thyristors or IGBTs) of the rectifier module 110 based on the magnitude of fluctuations. The DC conversion control unit 134 can generate a DC conversion control signal that controls the DC-DC conversion operation (for example, including the constant voltage mode-constant current mode conversion control signal). There may be multiple DC conversion control signals, such as the DC conversion control signal loaded on the first DC-DC conversion module 150, and the DC conversion control signal loaded on the second DC-DC conversion module 170, which may be different. For example, the DC conversion control signal loaded on the second DC-DC conversion module 170 can be used to trigger the second DC-DC conversion module 170 to start working, and control the voltage of the third DC signal 171 specifically output by the second DC-DC conversion module 170.

Controller 177 may specifically comprise an arithmetic logic unit (ALU), a floating point unit (FPU), a digital signal processor (DSP), a programmable controller, or any combination thereof, which may be pre-programmed to realize, for example, the module shown in FIG. 3.

Figure 4:
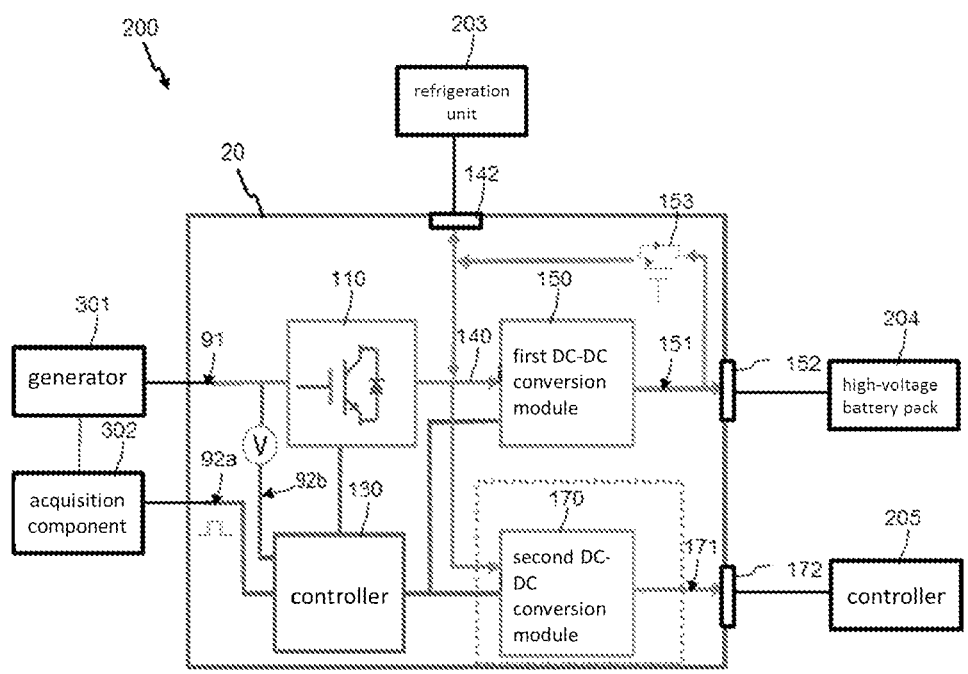
FIG. 4 is a schematic diagram of a module structure of a transport refrigeration device according to an embodiment of the present disclosure.

The power regulating unit 10 or 20 in the above examples can not only suppress the fluctuations of the AC input 91 and provide a stable DC output, but also provide multiple DC outputs in multiple modes, which is very suitable to be applied in an environment that requires highly stable DC outputs as well as multi-mode multiple DC outputs, such as the application in the transport refrigeration device 200 as shown in FIG. 4.

Based on the power regulating unit 20 illustrated in FIG. 2, FIG. 4 exemplarily describes the principle of applying the power regulating unit 20 to the transport refrigeration device 200. Referring to FIG. 4, the transport refrigeration device 200 can comprise a refrigeration unit 203 and a refrigeration unit controller 205. The transport refrigeration device 200 as a whole can be installed on an electric vehicle or a fuel vehicle in the form of, for example, being attached to a cooler box. In this way, the transport refrigeration device 200 can also control the temperature inside the cooler box during, for example, the transportation process.

When the transport refrigeration device 200 is installed on a fuel vehicle, since the fuel vehicle is generally equipped with a generator 301, the generator 301 can provide an AC input 91 for the power regulating unit 20 under transportation conditions. At the same time, the AC input 91 can be connected from outside, such as mains supply, under non-transportation conditions.

When the transport refrigeration device 200 is installed on an electric vehicle, the AC input 91 can be connected from outside, such as mains supply, under non-transportation conditions. Under transportation conditions, however, it can be high-voltage power battery packs that provides energy for electric vehicles, or dedicated battery packs for the transport refrigeration device 200 (for example, in the case where the high-voltage power battery packs of the electric vehicle are not allowed to be used), that provide DC high-voltage power supply for the refrigeration unit 203 and the power regulating unit 200. Under charging conditions, for example, the power regulating unit 20 can supply power to the refrigeration unit 203 and the high-voltage battery pack 204 at the same time.

With continued reference to FIG. 4, the first output port 142 of the power regulating unit 20 can output a first DC signal to the refrigeration unit 203 to supply power thereto. The second output port 152 of the power regulating unit 20 can output a second DC signal 151 for charging the high-voltage battery pack 204. The high-voltage battery pack 204 may be a dedicated battery pack for the transport refrigeration device 200. The third output port 172 of the power regulating unit 20 outputs a third DC signal 171 to the refrigeration unit controller 205 to supply power thereto.

It can be seen that the power regulating unit 20/transportation refrigeration device 200 can be compatible with both fuel vehicles with generators 301 and new electric vehicles, thereby having good applicability. The multi-mode DC outputs, while charging the high-voltage battery pack 204 (such as the dedicated high-voltage battery pack 204 of the transport refrigeration device 200), can also supply power to the refrigeration unit 203 and even the refrigeration unit controller 205 normally, so as to ensure that the temperature of the transport refrigeration device 200, such as the container, is in good control during the charging process. Moreover, since it is not necessary to provide multiple power regulating units for the transport refrigeration device 200, it saves cost and installation space.

It is understood that when a component is said to be "connected" or "coupled" to another component, it can be directly connected or coupled to another component, or intermediate component(s) may be present.

The above examples mainly illustrate the power regulating unit and the transport refrigeration device using the same of the present invention. Although only some of the embodiments of the present invention are described, those skilled in the art should understand that the present invention can, without departing from the spirit and scope of the invention, be implemented in many other forms. Therefore, the illustrated examples and embodiments are to be considered as illustrative but not restrictive, and the present invention may cover various modifications or replacements without departing from the spirit and scope of the present invention as defined by the appended claims.

What is claimed is:

1. A transport refrigeration device comprising a refrigeration unit, a refrigeration unit controller, and a power regulating unit for converting an AC input to a DC output, the power regulating unit comprising:
   a rectifier module configured to perform a rectification operation on the AC input to obtain a first DC signal;
   a controller configured to control the rectification operation of the rectifier module based on corresponding parameter information for reflecting fluctuations of the AC input to prevent the first DC signal obtained from being affected by the fluctuations;
   a first output port configured to output the first DC signal, wherein the first output port of the power regulating unit outputs a first DC signal to the refrigeration unit to supply power to the refrigeration unit;
   a first DC-DC conversion module separate from the rectifier module, the first DC-DC conversion module configured to convert the first DC signal into a second DC signal;
   a second output port separate from the first output port, the second output port configured to output the second DC signal;
   wherein the second output port of the power regulating unit outputs a second DC signal for charging a high-voltage battery pack, and wherein the high-voltage battery pack is a dedicated battery pack provided in the transport refrigeration device;
   a second DC-DC conversion module configured to convert the first DC signal into a third DC signal; and
   a third output port configured to output the third DC signal.

2. The transport refrigeration device according to claim 1, wherein the first DC-DC conversion module is configured as a DC charging output device capable of providing a constant voltage or constant current charging mode.

3. The transport refrigeration device according to claim 1, wherein the first DC-DC conversion module and/or the second DC-DC conversion module comprises an LLC resonance circuit.

4. The transport refrigeration device according to claim 1, wherein the first DC signal is a high-voltage DC power supply suitable for supplying power to a refrigeration unit, the second DC signal is a DC charging power supply suitable for charging a high-voltage battery pack, and the third DC signal is a low-voltage DC power supply suitable for supplying power to the refrigeration unit controller, wherein the output voltage of the low-voltage DC power supply is smaller than the output voltage of the high-voltage DC power supply.

5. The transport refrigeration device according to claim 1, wherein the parameter information comprises AC voltage and AC frequency; or the parameter information comprises AC voltage and generator speed, and/or generator temperature, wherein the AC input is output and provided by the generator.

6. The transport refrigeration device according to claim 1, wherein the controller is configured to comprise:

a parameter information processing unit configured to analyze and process the received parameter information;

a comparison unit configured to compare the corresponding parameter information that is analyzed and processed with a predetermined value to determine the magnitude of fluctuations; and a rectification control signal generating unit configured to generate a rectification control signal for the switch element of the rectifier module based on the magnitude of fluctuations.

7. The transport refrigeration device according to claim 6, wherein the controller is configured to further comprise: a DC conversion control unit configured to generate a DC conversion control signal for controlling a DC-DC conversion operation.

8. The transport refrigeration device according to claim 1, wherein the rectifier module is a thyristor module or an Insulated Gate Bipolar Transistor (IGBT) rectifier module.

9. The transport refrigeration device according to claim 1, wherein the third output port of the power regulating unit outputs the third DC signal to the refrigeration unit controller to supply power to the refrigeration unit controller.

* * * * *